United States Patent
Driscoll

(10) Patent No.: US 9,779,356 B2
(45) Date of Patent: Oct. 3, 2017

(54) METHOD OF MACHINE LEARNING CLASSES OF SEARCH QUERIES

(71) Applicant: British Sky Broadcasting Limited, Isleworth, Middlesex (GB)

(72) Inventor: Simon John Driscoll, Isleworth (GB)

(73) Assignee: SKY CP LIMITED, Isleworth, Middlesex (GB)

( * ) Notice: Subject to any disclaimer, the term of this patent is extended or adjusted under 35 U.S.C. 154(b) by 415 days.

(21) Appl. No.: 14/378,958

(22) PCT Filed: Feb. 8, 2013

(86) PCT No.: PCT/GB2013/050296
§ 371 (c)(1),
(2) Date: Aug. 14, 2014

(87) PCT Pub. No.: WO2013/121181
PCT Pub. Date: Aug. 22, 2013

(65) Prior Publication Data
US 2014/0372349 A1    Dec. 18, 2014

(30) Foreign Application Priority Data
Feb. 14, 2012   (GB) .................................. 1202492.3

(51) Int. Cl.
*G06F 15/18* (2006.01)
*G06N 5/04* (2006.01)
*G06F 17/30* (2006.01)
*G06N 99/00* (2010.01)

(52) U.S. Cl.
CPC ......... *G06N 5/04* (2013.01); *G06F 17/30864* (2013.01); *G06N 99/005* (2013.01)

(58) Field of Classification Search
USPC .......................................................... 706/12
See application file for complete search history.

(56) References Cited

U.S. PATENT DOCUMENTS

| 7,783,636 | B2* | 8/2010 | Church | G06F 17/30657 707/732 |
| 8,521,561 | B2* | 8/2013 | Sasai | G06F 17/30265 705/2 |
| 9,484,021 | B1* | 11/2016 | Mairesse | G10L 15/08 |
| 9,652,695 | B2* | 5/2017 | Bengio | G06K 9/723 |

(Continued)

OTHER PUBLICATIONS

Identifying machine query for an intelligent web browser system Tingshao Zhu; Xinguo Xu; Guohua Liu 2010 IEEE 2nd Symposium on Web Society Year: 2010 pp. 108-113, DOI: 10.1109/SWS.2010.5607470 IEEE Conference Publications.*

(Continued)

*Primary Examiner* — Michael B Holmes
(74) *Attorney, Agent, or Firm* — Kilpatrick Townsend & Stockton LLP

(57) ABSTRACT

A computer-implemented method of determining search intent, comprises: receiving a search query; searching content across a plurality of content classes using the search query, so as to obtain a plurality of search results; deriving summary data from the search results; applying the summary data to a trained machine learning model; and determining from the machine learning model a selected one of the content classes corresponding to the search intent of the search query.

16 Claims, 7 Drawing Sheets

(56) References Cited

U.S. PATENT DOCUMENTS

| | | | | |
|---|---|---|---|---|
| 2008/0082485 | A1* | 4/2008 | Church | G06F 17/30657 |
| 2013/0060591 | A1* | 3/2013 | Meegan | G06Q 50/01 |
| | | | | 705/7.19 |
| 2013/0151235 | A1* | 6/2013 | Och | G06F 17/27 |
| | | | | 704/9 |
| 2014/0372349 | A1* | 12/2014 | Driscoll | G06F 17/30864 |
| | | | | 706/12 |
| 2015/0178596 | A1* | 6/2015 | Bengio | G06N 7/005 |
| | | | | 382/159 |
| 2017/0124487 | A1* | 5/2017 | Szeto | G06N 7/005 |

OTHER PUBLICATIONS

Towards Web Spam Filtering Using a Classifier Based on the Minimum Description Length Principle Renato M. Silva; Tiago A. Almeida; Akebo Yamakami 2016 15th IEEE International Conference on Machine Learning and Applications (ICMLA) Year: 2016 pp. 470-475, DOI: 10.1109/ICMLA.2016.0083 IEEE Conference Publications.*

A Machine Learning Based Web Spam Filtering Approach Santosh Kumar; Xiaoying Gao; Ian Welch; Masood Mansoori 2016 IEEE 30th International Conference on Advanced Information Networking and Applications (AINA) Year: 2016 pp. 973-980, DOI: 10.1109/AINA.2016.177 IEEE Conference Publications.*

International Preliminary Report on Patentability and Written Opinion dated Aug. 19, 2014 for International Application No. PCT/GB2013/050296, 7 pages.

Pilato et al., "A Concurrent Neural Classifier for HTML Documents Retrieval", *Neural Nets: Lecture Notes in Computer Science*, Jun. 4-7, 2003, 2859:210-217.

* cited by examiner

METHOD OF MACHINE LEARNING CLASSES OF SEARCH QUERIES

CROSS REFERENCE TO RELATED APPLICATIONS

This application is a National Stage of International Application No. PCT/GB2013/050296, filed Feb. 8, 2013, which claims priority to Great Britain Application No. 1202492.3, filed on Feb. 14, 2012. These applications are incorporated herein by reference for all purposes.

FIELD OF THE INVENTION

The present invention relates to a search method, and particularly but not exclusively to a method of determining user search intent in a search engine, particularly a vertical search engine.

BACKGROUND OF THE INVENTION

In general web search sites, such as Google™ or Bing™, users expect to be able to enter any type of query in a single search box, and get relevant search results tailored to their query. For example, a Google™ search for 'hampton' may return a map of possible locations for Hampton, contact details for businesses including the word 'Hampton', and news items about or by people called Hampton.

Vertical search engines, on the other hand, are designed for searching specific classes of content, and typically require the user to select the appropriate vertical search engine for the required class. For example, the applicant's 'My Sky' web site includes separate search pages for programme content ('Find & Watch TV'), support ('Help and Support'), and products ('Sky Products'). Each of these search pages returns results in a format appropriate to the class of content searched.

In keeping with customer expectations from general web search engines, vertical search engines may provide a single search box allowing users to search across multiple classes of content. For example, the applicant's 'My Sky' web page (available on 6 Feb. 2012 at http://www.sky.com/mysky/indexb.html) allows users to search across programme content, support and products. However, such searches typically return content from all classes, regardless of the likely search intent of the user. For example, a search for 'PIN' on the 'My Sky' web page may return support information about finding or resetting a PIN, which is likely to be the information required, but also may return for example a program listing relating to 'Ten Pin Bowling' and a news item relating to 'Elizabeth Hurley's Pin Dress', which are less likely to be required.

It would be desirable to combine the convenience of a single search box with the relevance of search results tailored to the user's search intent, particularly in a vertical search engine. However, it is difficult to predict reliably which class of content corresponds to the user's search intent.

STATEMENTS OF THE INVENTION

According to the present invention, there is provided a search engine in which a user query is searched across a plurality of discrete classes of content. Summary information relating to the content classes of the results is input into a supervised machine learning algorithm, such as a neural network or support vector machine (SVM), which identifies the likely class corresponding to the user's search intent. The search results returned to the user may be limited to content from the likely class. The search results may be formatted according to the likely class. The class-specific limitation and/or formatting may occur only if the confidence rating from the supervised machine learning algorithm is above a threshold.

The summary information may comprise a normalised number of search results produced from each class of content, and/or an indication of the class to which the most relevant search results belonged.

The supervised machine learning algorithm may be trained using a training set of search queries, for which the class of search intent has been predetermined. Preferably, the supervised machine learning algorithm is not changed during subsequent use. The supervised machine learning algorithm may not need to be retrained as the available content changes, but may be retrained with one or more further training sets only if necessary. The supervised machine learning algorithm may be a feedforward back-propagation network or an SVM.

Other aspects of the invention include a method of operating and/or training the search engine, and a computer programme product for performing the method.

In tests using the applicant's search indexes, with a confidence threshold of 99.95%, the search engine derived the user's search intent correctly 95% of the time, which was significantly better than results using a rule-based classifier.

BRIEF DESCRIPTION OF THE DRAWINGS

There now follows, by way of example only, a detailed description of embodiments of the present invention, with reference to the figures identified below.

DETAILED DESCRIPTION OF THE EMBODIMENTS

Overview

Figure 1:
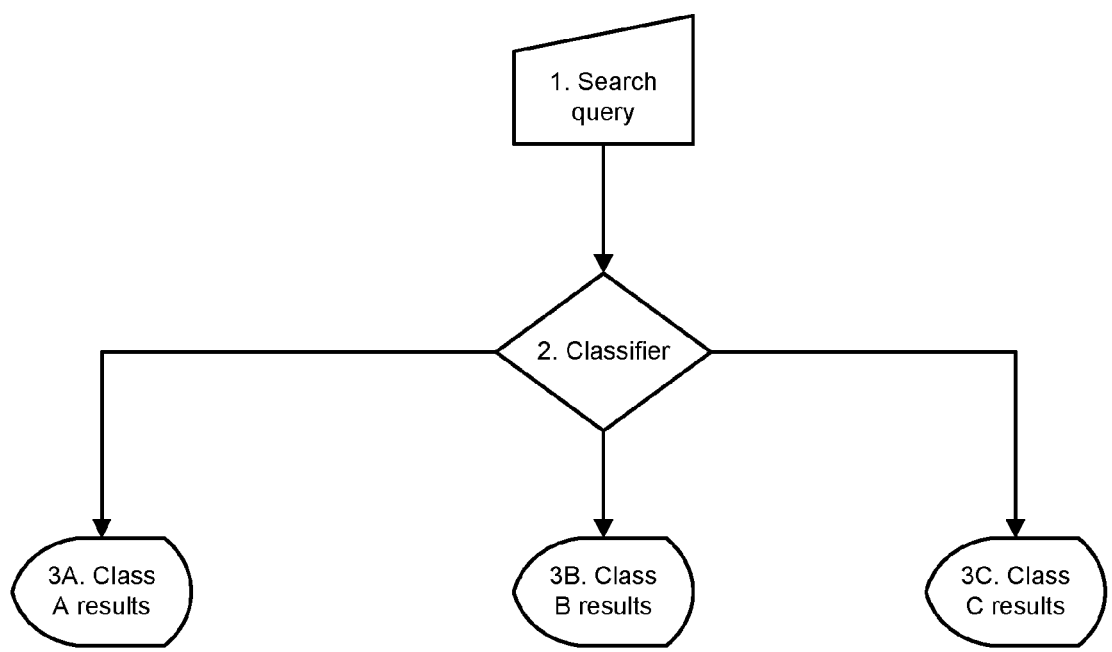
FIG. 1 is a schematic diagram of the operation of a search intent classifier in an embodiment of the invention.

FIG. 1 illustrates an overview of the operation of a search intent classifier in an embodiment of the invention, from the user's perspective. A user enters a search query 1 into the search engine, for example via a web page interface. The search query is processed by a search intent classifier 2, which determines the class of content which the user is most likely to be searching and outputs only the search results 3A-3C from the class (Class A-C) which the search intent classifier has determined is most likely to correspond to the user's search intent, on the basis of the input search query and the search results across content from different classes (Class A-C).

Detailed Operation

Figure 2:
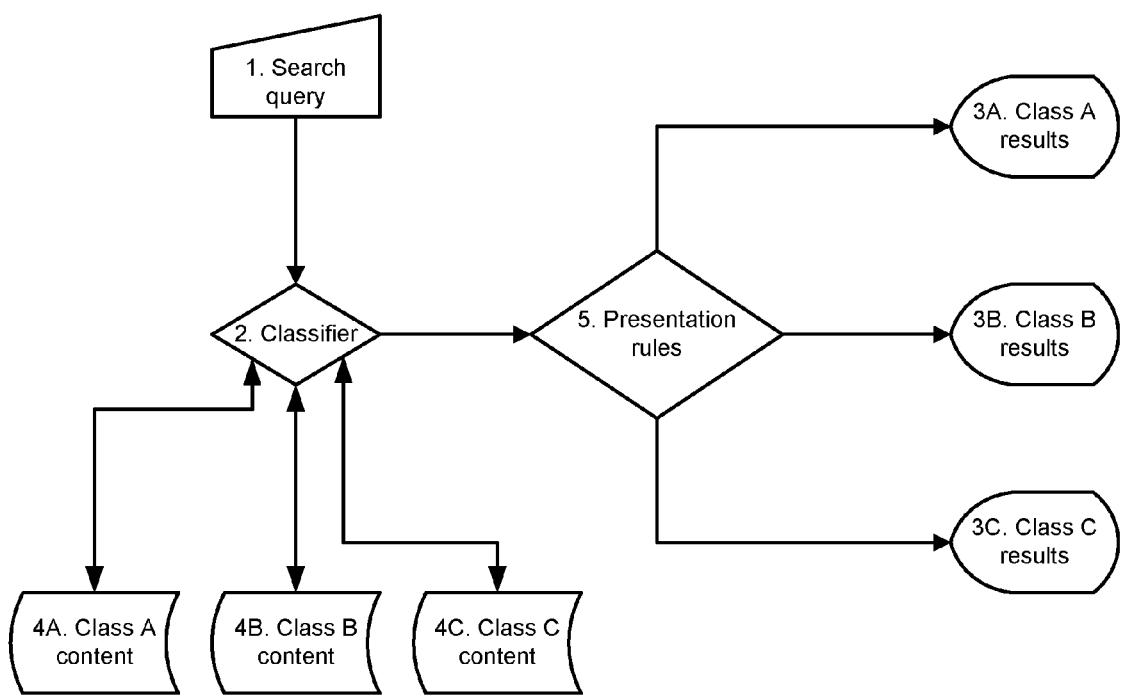
FIG. 2 is a more detailed diagram of the operation of the search intent classifier in use.
Figure 3:
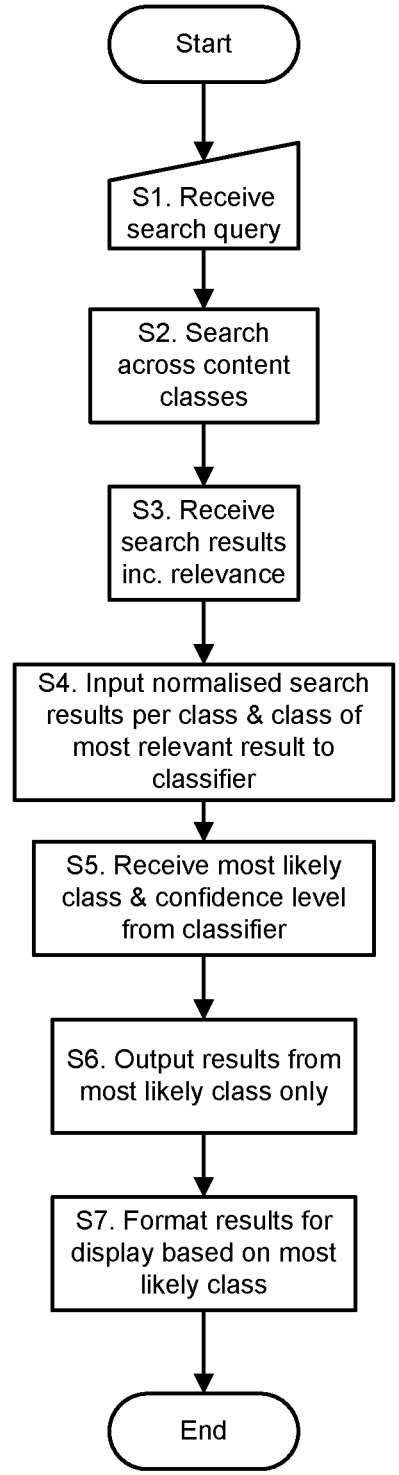
FIG. 3 is a flowchart of the operation as performed at the server side.

FIGS. 2 and 3 illustrate the operation of the embodiment in more detail, as performed for example by a search server made available over the Internet to user clients, such as web browsers.

The user's search query is received (step S1) and is used to search each class (A-C) of content (step S2). The search itself may be performed by a conventional search engine, for example an index-based search engine that creates and searches a text index of each class of content. Although the different classes of content are shown as discrete, the content may be stored in a unitary database, with each content item having an associated class.

The search engine returns a set of results satisfying a minimum relevance criterion to the search query (step S3). Hence, the number of search results is likely to vary across the different classes searched, depending on the relevance of search query to that class and on the total number of content items in each class. To compensate for the latter, the number of search results of each class is normalised, for example expressed as a percentage or fraction of the total number of content items in that class; the normalised numbers of search results for each class are input to the classifier (step S4). Each search result includes an indication of the relevance of that result; from this, the most relevant search result among all the classes is identified, and the class (A, B or C) of that result is also input to the classifier (step S4).

The classifier 2 outputs the class (A, B or C) most likely to correspond to the search intent of the user, together with a confidence level indication (step S5). Provided the confidence level indication is above a predetermined threshold, only the results from the most likely class, as indicated by the classifier 2, are output for display to the user (step S6). Moreover, since the output search results belong to only one class, presentation rules 5 for presenting the results are selected according to that class (step S7).

For example, the user may enter the term 'PIN' as a search query. This term is search across all available classes of content, such as Programmes, Support and Products. The numbers and percentage of results from each class may be as shown below in Table 1:

TABLE 1

| | Number of Content items | Results returned | Percentage |
|---|---|---|---|
| A (Programmes): | 100,546 | 65 | 0.06% |
| B (Support): | 5,604 | 45 | 0.8% |
| C (Products): | 2,510 | 3 | 0.1% |

Also, the most relevant search result comes from class B (Support). The percentages, and the class of the most relevant result (Support) are input to the classifier, which produces the output:

Search intent class: B (Support)
Confidence level: 99.98%

In this case, the confidence threshold is set at 99.95%, so the confidence level exceeds the threshold. Only the results from the Support class are output to the user, on a page formatted specifically for support content.

If the confidence level does not exceed the threshold, then the most relevant results across all the classes may be output, in a general format suitable for all classes. Alternatively or additionally, the user may be prompted to reformulate their query, for example so as to be more specific.

The determined search intent class for a specific query may be cached; when a new query is received, the search server may check the cache for the same query and, if present in the cache, the corresponding determined search intent class may be output from the cache rather than from the classifier 2, thus avoiding any delay caused by the classifier 2. Each entry may be cached for a limited period, such as 12 hours, before being deleted from the cache, since the content items may have changed significantly after that period.

The different classes A, B, and C may correspond to different programme types, such as a series (episodic), sports or movies, and the results formatted according to the programme type determined as the search intent. For example, if the search intent programme type is episodic, the most recent episode in the series may be prioritised, for example by listing first in the results. As another example, if the search intent programme type is sports, then imminent live sports events may be prioritised.

Supervised Machine Learning Classifier Training

Figure 4:
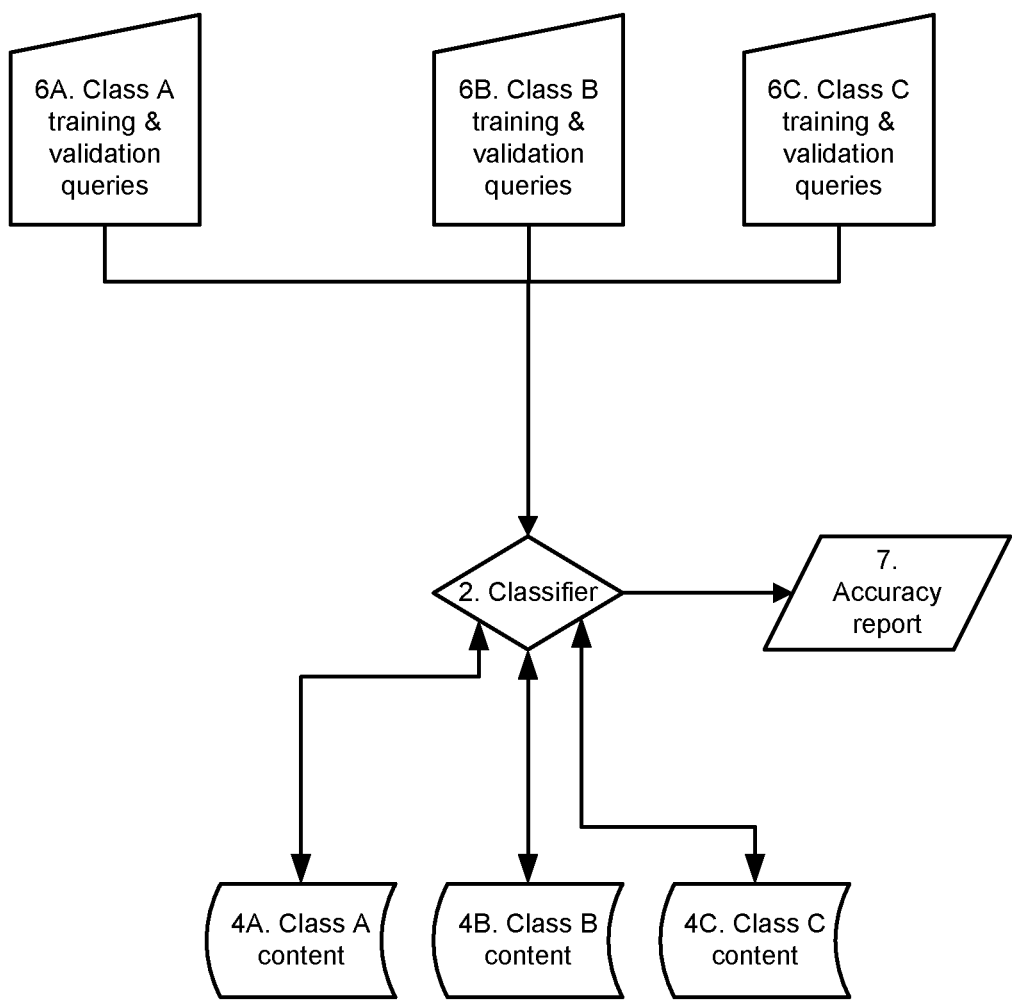
FIG. 4 is a schematic diagram of a training process for a search intent classifier in an embodiment of the invention.
Figure 5:
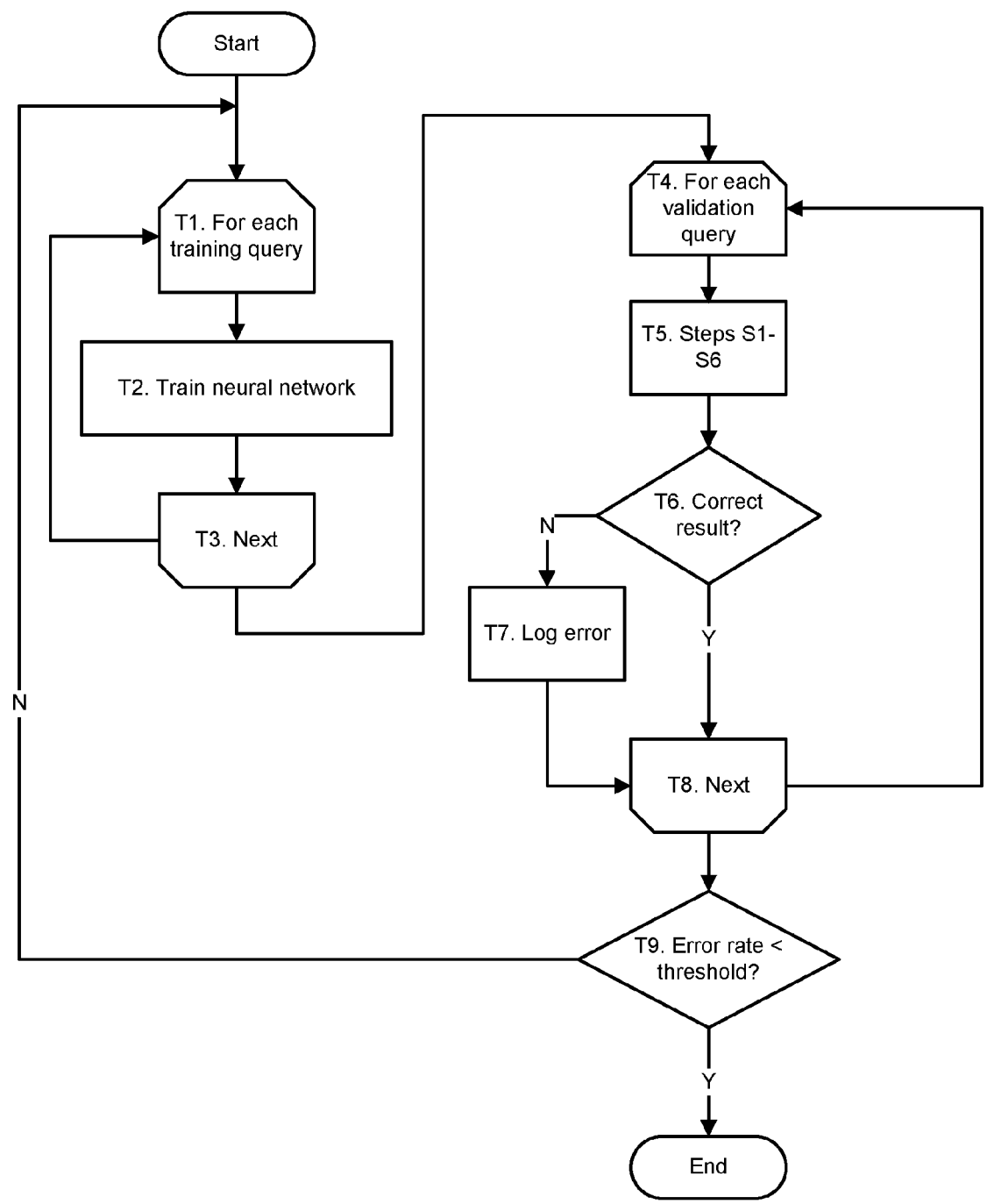
FIG. 5 is a flowchart of the training process of FIG. 4.

The classifier 2 preferably comprises a supervised machine learning algorithm, such as a neural network or SVM, which must be trained with a sample set of queries before the classifier 2 is put into operation, as described above. The training process may be a backpropagation method as described below with reference to FIGS. 4 and 5.

First, a set of commonly used queries is created, for which there is a high likelihood that the search intent relates to one specific class, and the corresponding specific class is determined for example by human operators. The set of queries and their corresponding specific classes are split into training and validation query sets 6A-6C. Before training, the supervised machine learning algorithm is seeded with random numbers.

Each training query is used to train the supervised machine learning algorithm (steps T1-T3), and the validation queries are then each used to perform steps S1 to S6 as described above (steps T4, T5). Any differences between the output of the classifier 2 and the predetermined specific classes of the validation queries are logged as errors (steps T6-T7).

Once all of the training queries have been used, the log is used to generate an accuracy report 7, and training is repeated (step T9) until the error rate for the last round of training is below a predetermined threshold, such as 2%. Then, the supervised machine learning algorithm classifier 2 is put into operation as described above.

Preferably, the classifier 2 is not further trained during operation, but may be retrained with further query sets (6A-C) as required. Alternatively, training may be allowed to continue during operation, but this would rely on users giving accurate feedback as to whether their search intent has been accurately determined by the classifier.

In one specific example, the supervised machine learning algorithm is a feedforward backpropagation neural network. The Encog™ neural network framework was used to generate the neural network. The number of inputs and outputs corresponds to the number of different classes, and the number of nodes in the intermediate layer(s) is determined by experimentation.

System Architecture

Figure 6:
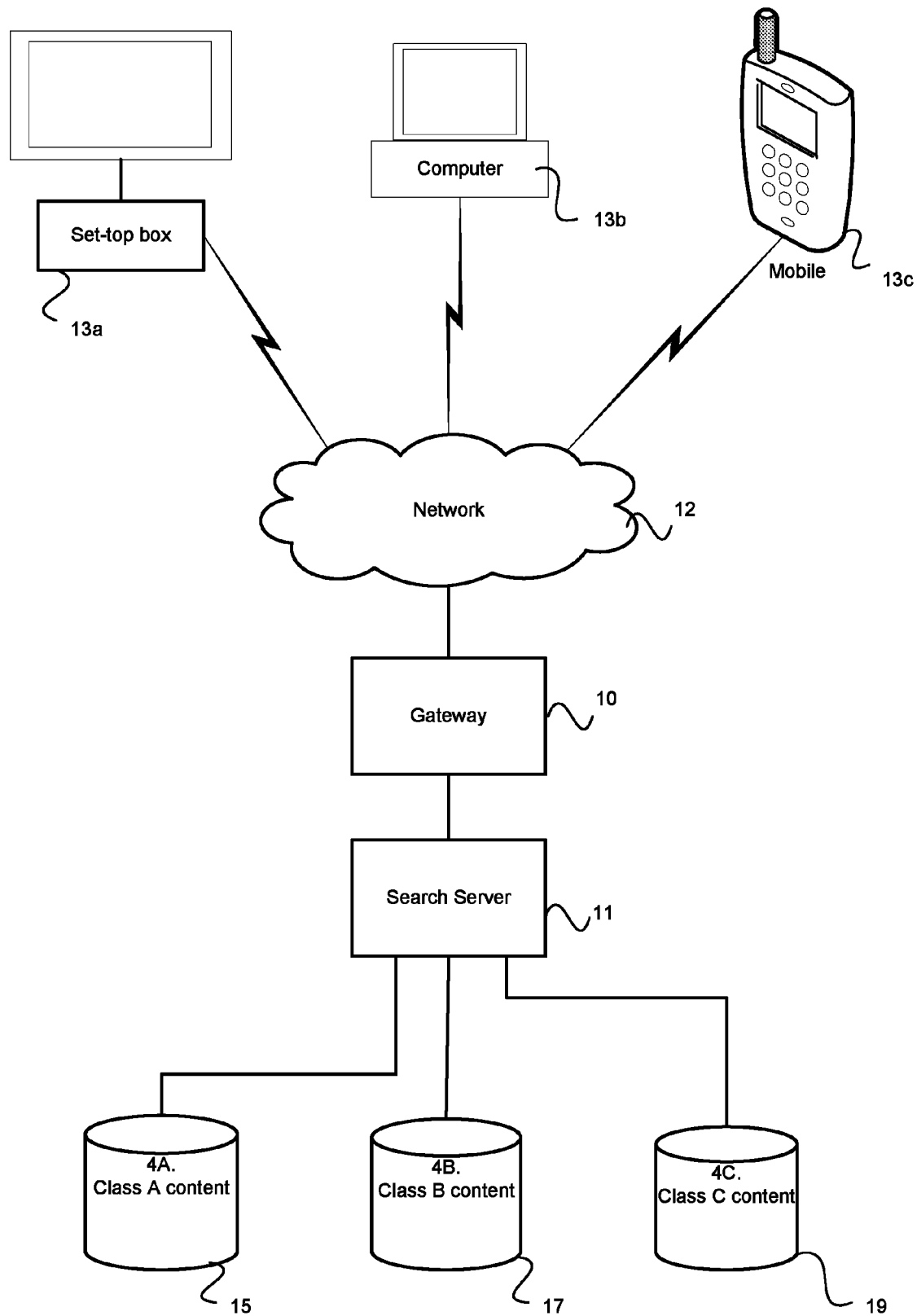
FIG. 6 is a diagram of a system architecture on which embodiments of the invention may be implemented.

FIG. 6 is a diagram of a system architecture to which embodiments of the invention may be applied. The search server 11 has access to databases 4A, 4B, 4C containing the content of the respective classes A, B and C. The databases 4A, 4B, 4C may be stored in respective database servers 15, 17, 19, or may be integrated within the same database server.

The search server 11 is connected via a gateway 10 to a network 12, comprising for example the Internet, wireless, cellular and/or other networks. The gateway 10 provides an interface between the search server 11 and client devices such as a set-top box 13a, computer 13b, and/or mobile device 13c, using appropriate protocols for the respective device. For example, the gateway may provide a web server for a browser client, or may use simple protocols such as WAP, SMS or USSD for communication with the mobile device 13c. Each device 13a, 13b, 13c may send search requests to the gateway 10 over the network 12, and receive corresponding search results from the gateway 10. The gateway 10 may format the search results according to the presentation rules 5 and/or the display capabilities of the respective devices 13a, 13b, 13c.

ALTERNATIVE EMBODIMENTS

Alternative embodiments may be envisaged on reading the present application, which nevertheless fall within the scope of the following claims. For example, the present invention is not limited to searching over the Internet, but is equally applicable to searching content over an Intranet. While the embodiments may advantageously be applied to vertical search engines, they may also be applied to general search engines.

Computer Systems

Figure 7:
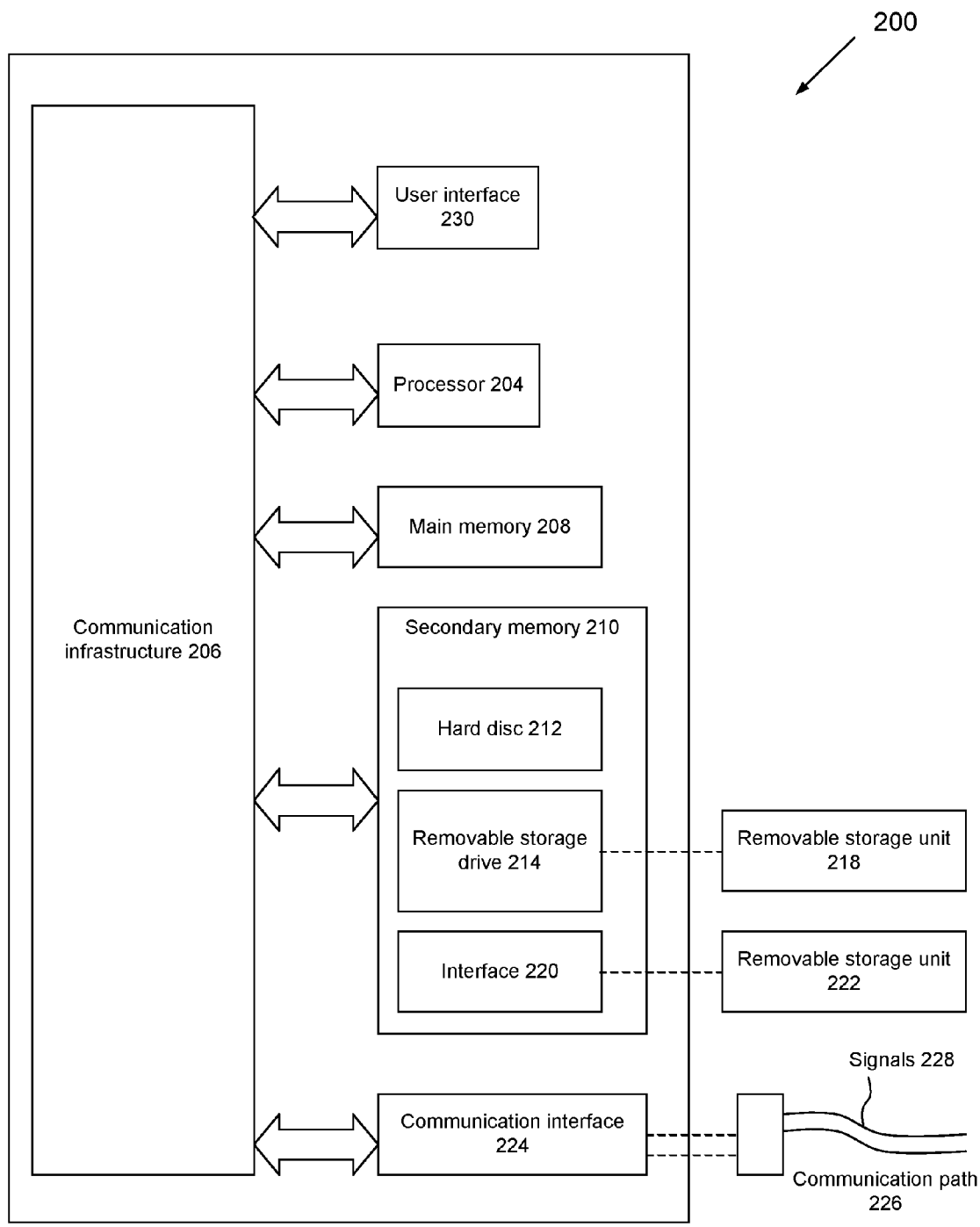
FIG. 7 is a diagram of a computer system on which embodiments of the invention may be implemented.

The entities described above, such as the classifier 2 and the search server 11, may be implemented by computer systems such as computer system 200 as shown in FIG. 7. Embodiments of the present invention may be implemented as programmable code for execution by such computer systems 200. After reading this description, it will become apparent to a person skilled in the art how to implement the invention using other computer systems and/or computer architectures.

Computer system 200 includes one or more processors, such as processor 204. Processor 204 may be any type of processor, including but not limited to a special purpose or a general-purpose digital signal processor. Processor 204 is connected to a communication infrastructure 206 (for example, a bus or network). Various software implementations are described in terms of this exemplary computer system. After reading this description, it will become apparent to a person skilled in the art how to implement the invention using other computer systems and/or computer architectures.

Computer system 200 also includes a main memory 208, preferably random access memory (RAM), and may also include a secondary memory 610. Secondary memory 210 may include, for example, a hard disk drive 212 and/or a removable storage drive 214, representing a floppy disk drive, a magnetic tape drive, an optical disk drive, etc. Removable storage drive 214 reads from and/or writes to a removable storage unit 218 in a well-known manner. Removable storage unit 218 represents a floppy disk, magnetic tape, optical disk, etc., which is read by and written to by removable storage drive 214. As will be appreciated, removable storage unit 618 includes a computer usable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that previously found in video game devices), a removable memory chip (such as an EPROM, or PROM, or flash memory) and associated socket, and other removable storage units 222 and interfaces 220 which allow software and data to be transferred from removable storage unit 222 to computer system 200. Alternatively, the program unit 222 may be executed and/or the data accessed from the removable storage unit 222, using the processor 204 of the computer system 200.

Computer system 200 may also include a communication interface 224. Communication interface 224 allows software and data to be transferred between computer system 200 and external devices. Examples of communication interface 224 may include a modem, a network interface (such as an Ethernet card), a communication port, a Personal Computer Memory Card International Association (PCMCIA) slot and card, etc. Software and data transferred via communication interface 224 are in the form of signals 228, which may be electronic, electromagnetic, optical, or other signals capable of being received by communication interface 224. These signals 228 are provided to communication interface 224 via a communication path 226. Communication path 226 carries signals 228 and may be implemented using wire or cable, fibre optics, a phone line, a wireless link, a cellular phone link, a radio frequency link, or any other suitable communication channel. For instance, communication path 226 may be implemented using a combination of channels.

Computer system 200 may also include a user interface 230, either locally or remotely connected to the communication infrastructure 206.

The terms "computer program medium" and "computer usable medium" are used generally to refer to media such as removable storage drive 214, a hard disk installed in hard disk drive 212, and signals 228. These computer program products are means for providing software to computer system 200. However, these terms may also include signals (such as electrical, optical or electromagnetic signals) that embody the computer program disclosed herein.

Computer programs (also called computer control logic) are stored in main memory 208 and/or secondary memory 210. Computer programs may also be received via communication interface 224. Such computer programs, when executed, enable computer system 200 to implement embodiments of the present invention as discussed herein. Accordingly, such computer programs represent controllers of computer system 200. Where the embodiment is implemented using software, the software may be stored in a computer program product and loaded into computer system 200 using removable storage drive 214, hard disk drive 212, or communication interface 224, to provide some examples.

Alternative embodiments may be implemented as control logic in hardware, firmware, or software or any combination thereof.

The invention claimed is:

1. A computer-implemented method of determining search intent, comprising:
    a) receiving a search query at a search engine;
    b) searching content across a plurality of content classes using the search query, so as to obtain a plurality of search results;
    c) deriving, from the plurality of search results, summary data relating to the content class of the plurality of search results, wherein the summary data includes a normalised number of results from each of the content classes;
    d) applying the summary data to a trained machine learning model; and e) determining from the trained machine learning model a selected one of the content classes corresponding to the search intent of the search query.

2. The method of claim 1, further including outputting only the search results that belong to the selected one of the content classes.

3. The method of claim 2, including outputting only the search results belonging to the selected one of the content classes if the confidence indication exceeds a threshold, in accordance with a confidence indication of the selected one of the content classes received from the machine learning model.

4. The method of claim 2, further including formatting the output search results according to the selected one of the content classes.

5. The method of claim 4, wherein the output search results are prioritized according to the selected one of the content classes.

6. The method of claim 1, wherein the search results are formatted according to the type of a device from which the search query was received.

7. The method of claim 1, including caching the selected one of the content classes as corresponding to the search query, and retrieving the selected one of the classes from the cache if a subsequent search query corresponding to said search query is received.

8. The method of claim 1, wherein the machine learning model comprises a neural network or support vector machine.

9. The method of claim 1, further comprising:
a) receiving a set of training queries, each having an associated predetermined content class corresponding to the search intent thereof; and
b) training the machine learning model with the set of training queries.

10. The method of claim 9, further including:
receiving a set of validation queries, each having an associated predetermined content class corresponding to the search intent thereof, and validating the machine learning model by performing the method of claim 1 for each of the validation queries, and
comparing for each query the selected one of the classes as determined by the machine learning model with the predetermined content class associated with the respective query, to determine an error rate for the machine learning model.

11. The method of claim 10, comprising repeating said training and validation until the error rate falls below a threshold.

12. The method of claim 1, wherein the summary data includes an indication of the content class of the most relevant one of the search results.

13. A computer program product comprising:
program code means for storing program operations;
a processor at a search engine that performs the stored program operations to perform a method comprising:
a) receiving a search query at the search engine;
b) searching content across a plurality of content classes using the search query, so as to obtain a plurality of search results;
c) deriving, from the search results, summary data relating to the content class of the search results, wherein the summary data includes a normalised number of results from each of the content classes;
d) applying the summary data to a trained machine learning model; and
e) determining from the machine learning model a selected one of the content classes corresponding to the search intent of the search query.

14. A search server comprising:
program code means for storing program operations;
a processor at a search engine that performs the stored program operations to perform a method comprising:
a) receiving a search query at a search engine;
b) searching content across a plurality of content classes using the search query, so as to obtain a plurality of search results;
c) deriving, from the search results, summary data relating to the content class of the search results, wherein the summary data includes a normalised number of results from each of the content classes;
d) applying the summary data to a trained machine learning model; and
e) determining from the machine learning model a selected one of the content classes corresponding to the search intent of the search query.

15. The search server of claim 14, wherein the search server comprises a vertical search server.

16. A search intent classifier comprising:
a) an input terminal that receives summary data from results of a search across a plurality of content classes using a search query, wherein the summary data includes a normalised number of results from each of the content classes;
b) a trained machine learning model that receives the summary data and determines therefrom a selected one of the content classes corresponding to the search intent of the search query; and
c) an output module that indicates the selected one of the content classes.

* * * * *